US006614945B1

(12) United States Patent
Takaoka (10) Patent No.: US 6,614,945 B1
(45) Date of Patent: Sep. 2, 2003

(54) IMAGE PROCESSING METHOD AND APPARATUS

(75) Inventor: Naoki Takaoka, Kanagawa (JP)

(73) Assignee: Fuji Photo Film Co. Ltd., Kanagawa (JP)

( * ) Notice: Subject to any disclaimer, the term of this patent is extended or adjusted under 35 U.S.C. 154(b) by 0 days.

(21) Appl. No.: 09/325,751

(22) Filed: Jun. 4, 1999

(30) Foreign Application Priority Data

Jun. 5, 1998 (JP) .......................................... 10-157379

(51) Int. Cl.[7] ................................................ H04N 9/47
(52) U.S. Cl. ...................................... 382/274; 382/282
(58) Field of Search ......................... 382/274, 282–283, 382/254, 173–176, 180; 348/96; 358/487, 506

(56) References Cited

U.S. PATENT DOCUMENTS

| 6,191,810 B1 | * | 2/2001 | Oosaka et al. ............... 348/96 |
| 6,282,462 B1 | * | 8/2001 | Hopkins .................... 700/259 |
| 6,415,053 B1 | * | 7/2002 | Norimatsu .................. 382/199 |
| 6,427,050 B1 | * | 7/2002 | Chan ............................ 396/6 |

FOREIGN PATENT DOCUMENTS

| JP | 59-045765 A | 3/1984 |
| JP | 63-059678 A | 3/1988 |
| JP | 2-137070 A | 5/1990 |
| JP | 6161047 | 6/1994 |
| JP | 9161049 | 6/1997 |
| JP | 10065923 | 3/1998 |
| JP | 9281613 | 6/1999 |

OTHER PUBLICATIONS

Translation Of Notice of Reasons For Rejection.

* cited by examiner

Primary Examiner—Thomas D. Lee
Assistant Examiner—Stephen Brinich
(74) Attorney, Agent, or Firm—Birch, Stewart, Kolasch & Birch, LLP (57) ABSTRACT

Optimum image corrections (particularly, distortion correction and ambient light quantity correction) are performed for a film on which a pre-exposure image is recorded. In a case in which a pre-exposure image is recorded on a film, by previously separating an image into a photographed image and a pre-exposure image, only the photographed image is corrected by calculated predetermined image processing parameters.

12 Claims, 8 Drawing Sheets

FIG.6B

IMAGE PROCESSING METHOD AND APPARATUS

BACKGROUND OF THE INVENTION

1. Field of the Invention

The present invention relates to an image processing method and apparatus, in which image data obtained by photoelectrically reading an image on a film, in which a region not including a pre-exposure region having a predetermined image exposed in advance is used for photographing, is subjected to predetermined image processing, thereby forming output image data.

2. Description of the Related Art

Usually, photographic films are placed on the market in an unexposed state. However, for example, in recreational facilities such as an exhibition site and an amusement park, there is a case in which films with images such as a copy for advertisements relating to an exhibition, a character, and a mascot being in advance exposed thereon (pre-exposure images) may be sold. Particularly, in many cases, films with pre-exposure images being recorded thereon are sold as a so-called lens-fitted film package (LF).

In the lens-fitted film package (LF) with pre-exposure images being recorded thereon, a mask is in advance applied to a pre-exposure image portion and the pre-exposure image portion is not exposed during photographing. As a result, a film image with a practically photographed image and a pre-exposure image being combined can be obtained.

The film including a pre-exposure image as described above is processed in the same way as in an ordinary film.

On the other hand, there has been known in recent years a technology in which frame images recorded on a photographic film are photoelectrically read by a reading sensor such as a CCD, image processing such as enlargement/reduction or various corrections is performed for digital image data obtained by the reading, and based on the digital image data for which the image processing has been performed, images are formed on a recording material by modulated laser light.

In the technology in which frame images are read by a reading sensor such as a CCD in a digital manner, in order to realize accurate image reading, a frame image is preliminary read (so-called pre-scan), reading conditions corresponding to density of the frame image, and the like (for example, an amount of light irradiated on the frame image, charge accumulation time in a CCD, and the like) are determined, and the frame image is read again based on the determined reading conditions (so-called fine scan).

In an image photographed using a lens-fitted film package (LF), distortion occurs in a marginal image or an amount of light in a marginal image decreases, due to aberration or distortion of a lens. In this case, an amount of light in a marginal image in which a subject such as a wall other than a main subject is located is smaller than that at the center of the image in which a main subject is located at a high probability. As a result, in a finished print, a wall portion becomes dark and four corners are shaded.

In order to solve the above-described problem, distortion correction is performed, or correction in which an amount of light decreased in a marginal image is calculated from a histogram of a photographed image, or the like and is further added for each pixel or to an entire image is performed (ambient light quantity correction). Both of these corrections are each referred to as lens correction.

By performing these corrections, distortion in the marginal image is improved and the marginal image becomes bright. Accordingly, a proper image can be obtained.

The above-described distortion correction and ambient light quantity correction are both effective for an image practically photographed via a lens, but are not required for a pre-exposure image having an image recorded in advance. That is, when the distortion correction and the ambient light quantity correction are performed for a pre-exposure image exposed in a most suitable state, negative distortion occurs or an excess amount of light is applied in an image for which the corrections are performed.

SUMMARY OF THE INVENTION

In view of the above-described facts, it is an object of the present invention to provide an image processing method and apparatus, which allows most suitable image correction (particularly, distortion correction and ambient light quantity correction) for a film on which a pre-exposure images are recorded in advance.

In accordance with a first aspect of the present invention, there is provided an image processing apparatus comprising: image reading means for reading an image recorded on a film, the image including a pre-exposure region on which a predetermined image is in advance exposed, and a photographing region for photographing; image separating means which separates image data of the image read by the image reading means into pre-exposure image data for the pre-exposure region and photographed image data for the photographing region; correcting means which calculates image processing parameters and effects image correction for at least one of the pre-exposure image data and the photographed image data; and image synthesizing means which combines the pre-exposure image data and the photographed image data, at least one of which is corrected by the correcting means.

According to the first aspect of the present invention, the pre-exposure image (data) and the photographed image (data) are in advance separated from each other by the image separating means. The correcting means sets image processing parameters of at least one of the separated images independently and performs image corrections (for example, lens correction, color correction, and density correction). As a result, corrections suitable for at least one of the images are made. That is, the pre-exposure image is generally recorded optimally in a normal state. On the other hand, in the photographed image, a recording state, such as underexposure, normal exposure, overexposure, and super overexposure varies depending on a photographing state. Accordingly, it becomes necessary that the pre-exposure image and the photographed image be separately subjected to image corrections.

The pre-exposure image and the photographed image, at least one of which is subjected to image corrections, are recombined by the image synthesizing means to form one frame image on the film.

In accordance with a second aspect of the present invention, in the first aspect of the present invention, the correcting means corrects the photographed image data based on image processing parameters calculated based on only the photographed image data, and the correcting means further corrects the pre-exposure image data based on image processing parameters previously set based on the film.

According to the second aspect of the present invention, the pre-exposure image is, as described above, exposed optimally in a normal state. Further, since the pre-exposure image is not an image photographed through a lens, image processing parameters can be set in advance.

Accordingly, by calculating only image processing parameters of the photographed image from the photographed image, the image processing speed can be improved.

In accordance with a third aspect of the present invention, there is provided an image processing apparatus comprising: image reading means for reading an image recorded on a film, the image including a pre-exposure region on which a predetermined image is in advance exposed, and a photographing region for photographing; storage means for storing pre-exposure image data for the pre-exposure region, and pre-exposure image processing parameters including at least one of positional information of the pre-exposure image data and printing information of the pre-exposure image data; image separating means which separates image data of the image read by the image reading means into the pre-exposure image data and photographed image data for the photographing region; correcting means which calculates image processing parameters of the photographed image data and effects image correction for the photographed image data; image data reading means for reading the pre-exposure image data from the storage means; and image synthesizing means which combines the pre-exposure image data read by the image data reading means and the photographed image data corrected by the correcting means.

According to the third aspect of the present invention, since the pre-exposure image is in advance recorded on the film, pre-exposure image data and image processing parameters for the pre-exposure image, including the position of the pre-exposure image on the film and printing information, can be recognized. For this reason, the pre-exposure image data, the positional information, and the printing information (at least one of them) are stored in the storage means.

On the other hand, the photographed image is subjected to various image corrections by the correcting means, so as to form proper image. Subsequently, in the image data reading means, the pre-exposure image data stored in the storage means is read, and the photographed image data and the pre-exposure image data are combined by the image composite means. At this time, the positional information of the pre-exposure image data is also read at the same time, and therefore, the pre-exposure image and the photographed image are properly combined with each other.

In the foregoing, correction for the pre-exposure image is omitted. The reason why is that, assuming that the pre-exposure image is generally recorded in a proper printed state, corrections are not required for the pre-exposure image. However, the present invention is not limited to the same. Depending on a photographing state of the photographed image (for example, in a case in which the photographed image is in a super overexposure state, even if the correction is made for the photographed image, a rather bright image is obtained by the correction), the pre-exposure image may be corrected so that a composite image of the photographed image and the pre-exposure image is obtained with no sense of unnaturalness being visually produced (namely, a slightly bright pre-exposure image is suitable for a slightly bright photographed image).

In accordance with a fourth aspect of the present invention, in the image processing apparatus relating to the third aspect, the storage means stores a plurality of pre-exposure image data based on identification means for identifying the pre-exposure image data, and the identification means corresponding to a pre-exposure image recorded in advance on the film is provided for at least one of the film and a cartridge in which the film is accommodated.

The read pre-exposure image may be stored in the storage means, and in most cases, the pre-exposure image is generally provided as a template. Accordingly, in the fourth aspect of the present invention, a plurality of kinds of pre-exposure images may be stored, as templates, in storage means. In this case, an identification code is given to each of pre-exposure images and the identification code is recorded on a film or a cartridge in which the film is accommodated. As a result, by reading the identification code from the film or the cartridge during image reading, the pre-exposure image can be specified, and pre-exposure image data corresponding to a pre-exposure image previously recorded on the film can be read from the storage means.

In accordance with a fifth aspect of the present invention, there is provided an image processing method comprising: an image reading step for reading an image recorded on a film, the image including a pre-exposure region on which a predetermined image is in advance exposed, and a photographing region for photographing; an image separating step which separates image data of the image read in the image reading step into pre-exposure image data for the pre-exposure region and photographed image data for the photographing region; a correcting step which calculates image processing parameters and effects image correction for at least one of the pre-exposure image data and the photographed image data; and an image synthesizing step which combines the pre-exposure image data and the photographed image data, at least one of which is corrected in the correcting step.

DESCRIPTION OF THE PREFERRED EMBODIMENTS

Figure 1:
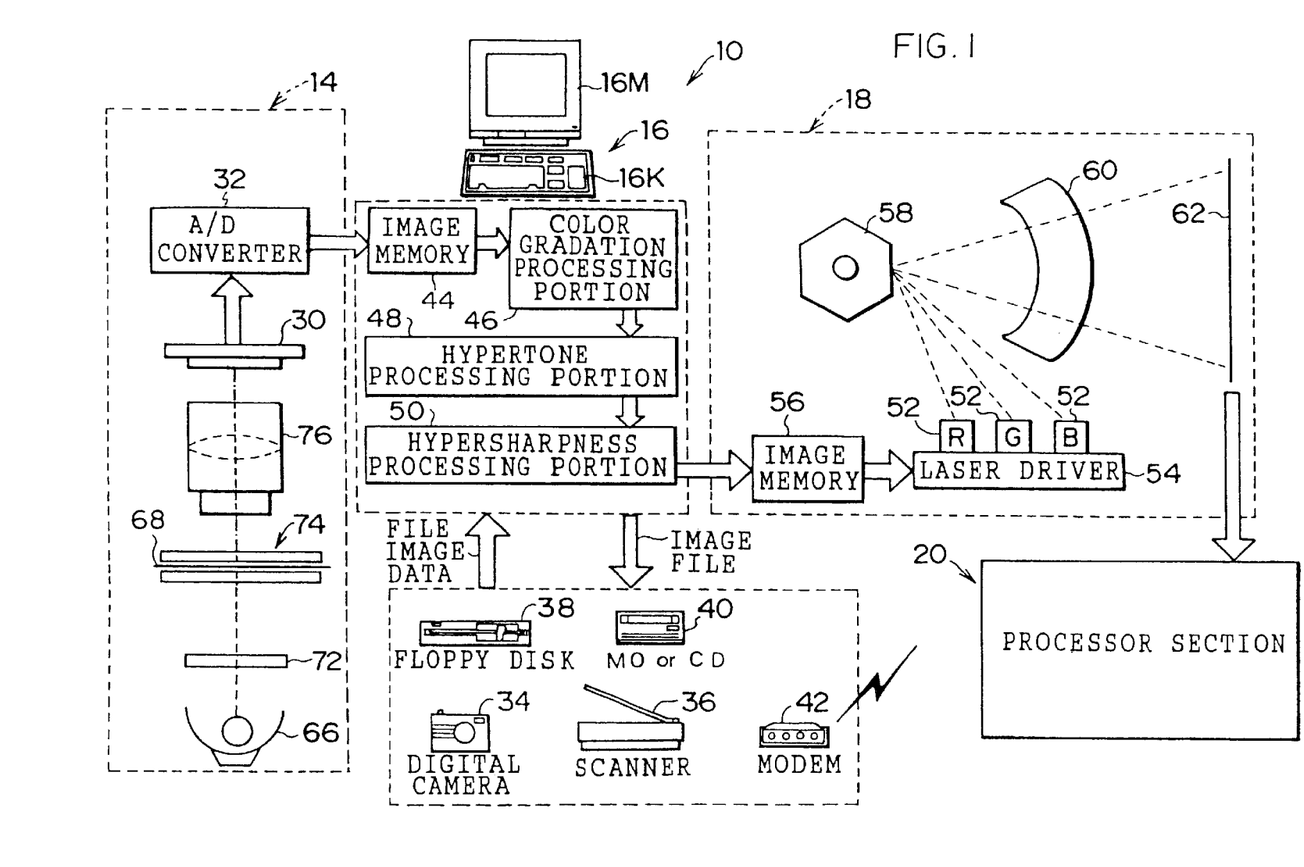
FIG. 1 is a schematic structural diagram of a digital laboratory system according to an embodiment of the present invention.
Figure 2:
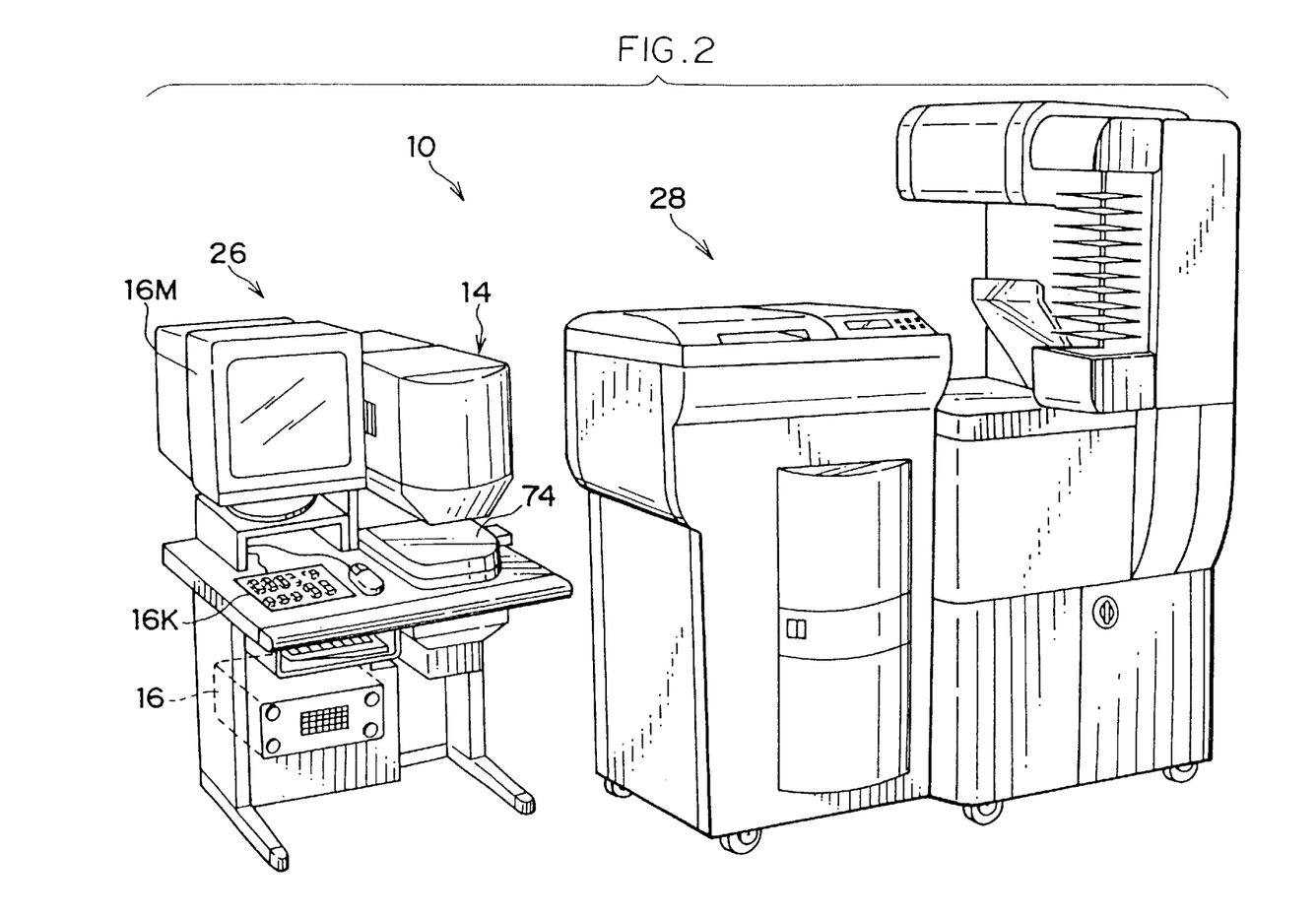
FIG. 2 is an outside view of the digital laboratory system.

FIGS. 1 and 2 each show a schematic structure of a digital laboratory system 10 according to the present embodiment.

As shown in FIG. 1, the digital laboratory system 10 is structured to include a line CCD scanner 14, an image processing section 16, a laser printer section 18, and a processor section 20. The line CCD scanner 14 and the image processing section 16 are integrated to form an input section 26 shown in FIG. 2 and the laser printer section 18 and the processor section 20 are integrated to form an output section 28 shown in FIG. 2.

The line CCD scanner 14 is used to read frame images recorded on a photographic film such as a negative film or a reversal film. Examples of the photographic film on which frame images to be read are recorded include a photographic film in 135 magazines, a photographic film in 110 magazines, a photographic film with a transparent magnetic layer formed thereon (i.e., a photographic film in 240 magazines: a so-called APS film), and photographic films in 120 magazines and 220 magazines (Brownie size). The line CCD scanner 14 reads the above-described frame images to be read by a line CCD 30 and makes A/D conversion in an A/D converter 32, and thereafter, outputs image data to the image processing section 16.

In the present embodiment, a description will be given in the case of the digital laboratory system 10 to which a photographic film in 240 magazines (APS film) 68 is applied.

The image processing section 16 is structured so that image data (scan image data) outputted from the line CCD scanner 14, image data obtained by photographing using a digital camera 34 or the like, image data obtained by reading an original (for example, a reflection original) by a scanner 36 (of the flat-bed type), image data generated by other computers and recorded in a floppy disk drive 38 and in an MO or CD drive 40, and communication image data received via a modem 42 (these image data will all be generically referred to as file image data) from the outside, are inputted thereto.

The image processing section 16 stores the inputted image data in an image memory 44 and performs image processing including various corrections in a color gradation processing portion 46, a hypertone processing portion 48, a hyper-sharpness processing portion 50, or the like, and further outputs the image data, as recording image data, to the laser printer section 18. The image processing section 16 is also allowed to output the image data subjected to the image processing, as an image file, to the outside (for example, to output the image data to a storage medium such as FD, MO, or CD, or transmit the image data to other information processing equipment via a communication line).

The laser printer section 18 includes laser light sources 52 of R, G, and B and applies laser light modulated in correspondence with the recording image data (temporarily stored in an image memory 56) inputted from the image processing section 16 onto a photographic printing paper by controlling a laser driver 54, and records an image on the photographic printing paper 62 by scan exposure (in the present embodiment, an optical system mainly using a polygon mirror 58 and an fθ lens 60). Further, the processor section 20 performs various processing including color development, bleach-fix, washing, and drying for the photographic printing paper 62 on which images are recorded by scan exposure in the laser printer section 18.

As a result, images are formed on the photographic printing paper.

Structure of Line CCD Scanner

Next, the structure of the line CCD scanner 14 will be described. FIG. 1 shows a schematic structure of an optical system of the line CCD scanner 14. This optical system includes a light source 66 which applies light to the photographic film 68. A light diffusion plate 72 by which the light applied to the photographic film 68 is made into diffused light is disposed at a light-emission side of the light source 66.

The photographic film 68 is conveyed by a film carrier 74, which is disposed at a side where the light diffusion plate 72 is provided, in such a manner that an image plane of each frame image is located perpendicular to an optical axis.

A lens unit 76 which allows image formation of light transmitted through the frame image, and the line CCD 30 are sequentially disposed along the optical axis at the side of the photographic film 68 opposite to the side at which the light source 66 is disposed. Although only a single lens is shown as the lens unit 76, the lens unit 76 is practically a zoom lens comprised of a plurality of lenses. Further, a SELFOC lens may also be used as the lens unit 76. In this case, it is preferable that both end surfaces of the SELFOC lens are located close to the photographic film 68 and the line CCD 30, respectively, as far as possible.

The line CCD 30 is structured in such a manner that three sensing portions each including a plurality of CCD cells arranged in a row along a transverse direction of the photographic film 68 being conveyed and further including an electronic shutter mechanism are provided in parallel at intervals so as to form three lines and color separation filters of R, G, and B are respectively mounted at light incident sides of the three sensing portions (a so-called three-line color CCD). The line CCD 30 is disposed in such a manner that a light receiving surface of each sensing portion coincides with an image-formation point of the lens unit 76.

Although not illustrated, a shutter is provided between the line CCD 30 and the lens unit 76.

Figure 3:
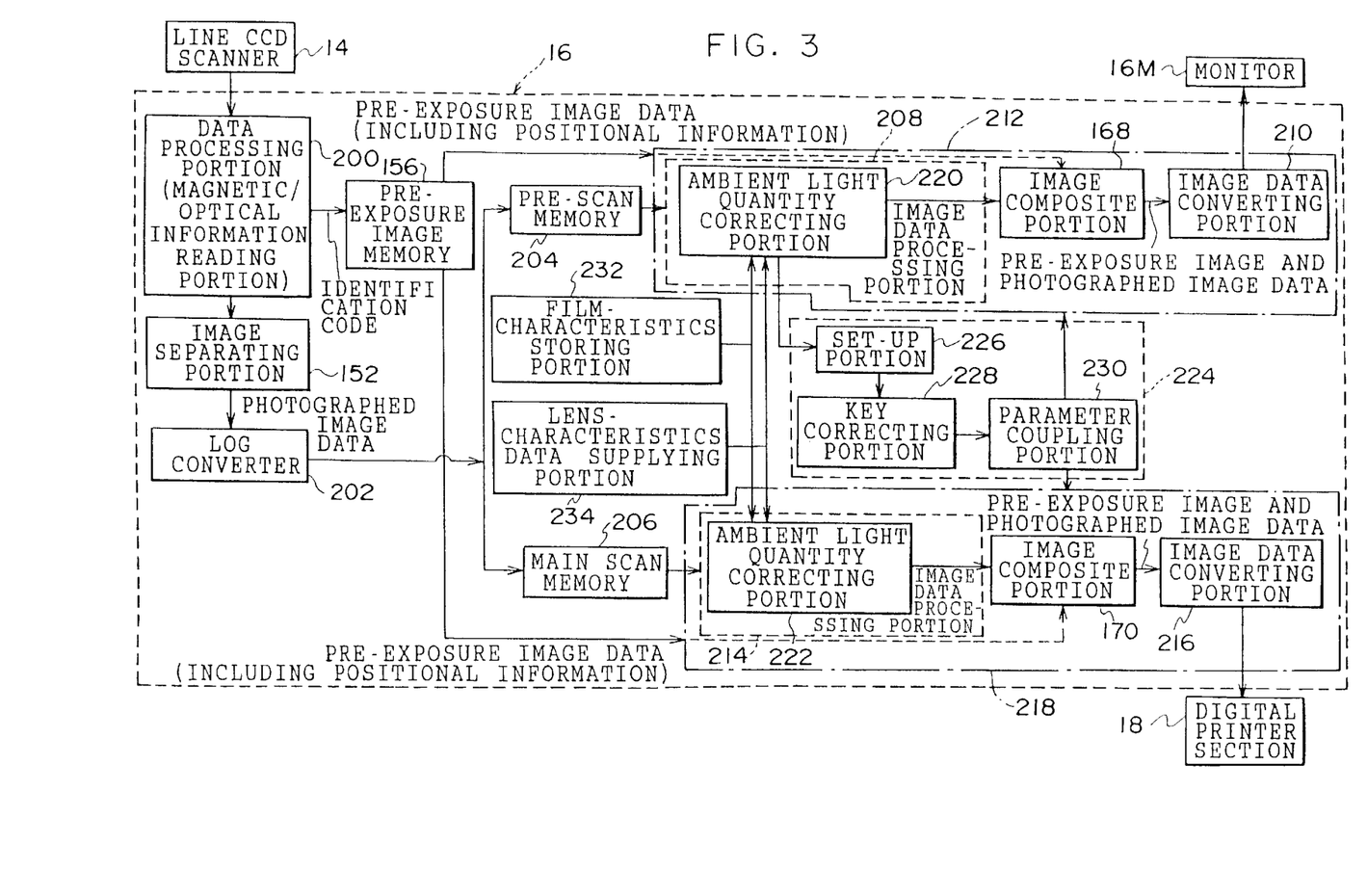
FIG. 3 is a control block diagram of an image processing section according to the embodiment of the present invention.

Structure of control system of image processing section 16:

FIG. 3 shows a detailed control block diagram for performing each of operations in the image memory 44, the color gradation processing portion 46, the hypertone processing portion 48, and the hyper-sharpness processing portion 50, which are main components of the image processing section 16 shown in FIG. 1.

Digital signals of R, G, and B outputted from the line CCD scanner 14 are each subjected to predetermined data processing including darkness correction, defective-pixel correction, shading correction, and the like in a data processing portion 200, and thereafter, these signals are each converted to digital image data (density data) by a Log converter 202. Pre-scan data is stored in a pre-scan memory 204 and main scan data is stored in a main scan memory 206.

The pre-scan data stored in the pre-scan memory 204 is transmitted to a pre-scan processing portion 212 formed by an image data processing portion 208 and an image data converting portion 210. On the other hand, the main scan data stored in the main scan memory 206 is transmitted to a main scan processing portion 218 formed by an image data processing portion 214 and an image data converting portion 216.

In each of the pre-scan processing portion 212 and the main scan processing portion 218, corrections based on lens characteristics at the time of photographing an image and stroboscopic light distribution characteristics at the time of photographing using electronic flash are performed.

In the image data processing portions 208 and 214, image processing such as color balance adjustment, contrast adjustment (color gradation processing), brightness correction and saturation correction (hypertone processing), and hyper-sharpness processing is performed by a known method, such as LUT or matrix (MTX) calculation.

Further, the image data processing portions 208 and 214 respectively includes ambient light quantity correcting portions 220 and 222 which each correct an amount of light in a marginal region (in a background) prior to the above-described adjustment and corrections.

Namely, the ambient light quantity correcting portions 220 and 222 each compensate, based on the lens characteristics, for a decline in the amount of light in an ambient region (in a background) to a main subject such as a human figure. The light quantity correction performed in the ambient light quantity correcting portions 220 and 222 will be described later.

In the image data converting portion 210 for pre-scan, image data processed by the image data processing portion 208 is converted, based on a 3D-LUT, to displaying image data to be displayed on the monitor 16M. In the image data converting portion 216 for main scan, image data processed by the image data processing portion 214 is converted, based on a 3D-LUT, to printing image data to be printed in the laser printer section 18. The display-oriented displaying image data and printing image data have different color specification systems and these data are provided to coincide with each other by various corrections, which will be described below.

Connected to the pre-scan processing portion 212 and to the main scan processing portion 218 is a condition setting portion 224.

The condition setting portion 224 is formed by a set-up portion 226, a key correcting portion 228, and a parameter integrating portion 230.

The set-up portion 226 sets a reading condition for main scan using pre-scan data and supplies it to the line CCD scanner 14, and further calculates image processing conditions for the pre-scan processing portion 212 and the main scan processing portion 218 and supplies them to the parameter integrating portion 230.

The key correcting portion 228 calculates an amount for adjustment of an image processing condition in accordance with various instructions inputted by keys, which are set on the keyboard 16K, for adjusting density, color, contrast, sharpness, and saturation, or inputted by a mouse, and supplies the same to the parameter integrating portion 230.

The parameter integrating portion 230 is provided to transfer the image processing conditions received from the set-up portion 226 and the key correcting portion 228 to the image processing potion 208 for pre-scan and to the image processing portion 214 for main scan, so as to correct and reset the image processing conditions.

A film-characteristics storing portion 232 is connected to the condition setting portion 224 and characteristics of various films are stored therein.

The film characteristics mentioned herein are gradation characteristics ($\gamma$ characteristics) and are generally represented by a curve in which density varies in a three-dimensional manner in accordance with an exposure amount. Note that the foregoing is well-known and a detailed description thereof will be omitted.

Figure 5:
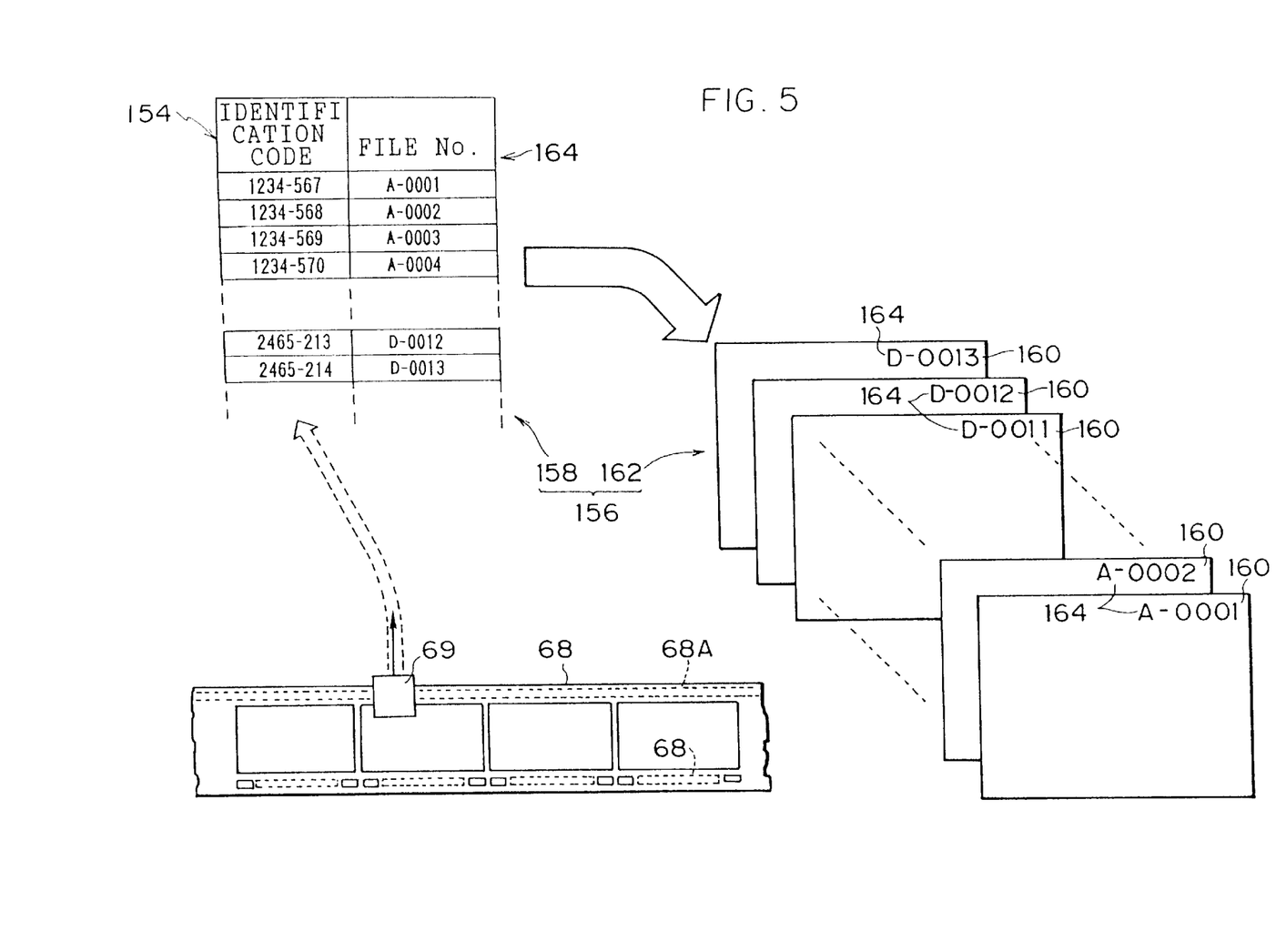
FIG. 5 is a system diagram which shows the relation between an identification code magnetically recorded on a photographic film, and a pre-exposure image recorded in a pre-exposure image memory.

In order to specify the kind of a film, in the present embodiment, information which indicates the kind of a film is recorded on a magnetic recording layer 68A of a photographic (APS) film 68 as shown in FIG. 5, and when the film is conveyed by the carrier 74 of the line CCD scanner 14, the information can be read by a magnetic head 69. Further, in the case of a photographic film in 135 magazines, the kind thereof may be determined based on the shape (perforations are formed at relatively short pitches in both ends in a transverse direction of the film) or may be inputted by an operator using a key.

A lens-characteristics data supplying portion 234 is connected to the condition setting portion 224. The lens-characteristics data supplying portion 234 acquires information which determines a camera employed for the film with which photographing is effected, and supplies the lens characteristics according to a photographing camera corresponding to the acquired determination information, to the ambient light quantity correcting portions 220 and 222.

That is, the lens-characteristics data supplying portion 234 includes a memory (table), and light distribution characteristics of lenses corresponding to various kinds of cameras are stored therein (as an example, including all of a lens applied to a lens-fitted film package (LF) and an interchangeable lens further including a stroboscope provided in an ordinary camera, but in the present embodiment, correction is made in the case of a lens for a lens-fitted film package). The light distribution characteristic varies depending on a photographing distance (a distance from a photographing position and a subject) and a plurality of light distribution characteristics corresponding to the photographing distance are stored for each stroboscope.

When an amount of ambient light is corrected based on the above-described lens characteristics, a variation in the amount of light between a human figure, which is a main subject, and a background can be alleviated.

The lens-characteristics data supplying portion 234 reads light distribution characteristics in accordance with the acquired lens-characteristics data, and supplies them to the ambient light quantity correcting portions 220 and 222. The distance from a photographing position to a subject may merely be recorded on the magnetic recording layer 68A in the case of using the APS film. Further, in the case of a photographic film in 135 magazines, and the like, the distance may be optically recorded or may also be recorded on a separate recording medium.

In this case, there is a possibility that the above-mentioned ambient light quantity correction may exert an adverse influence on a finished print depending on a photographing state.

Figures 4A, 4B, 4C:
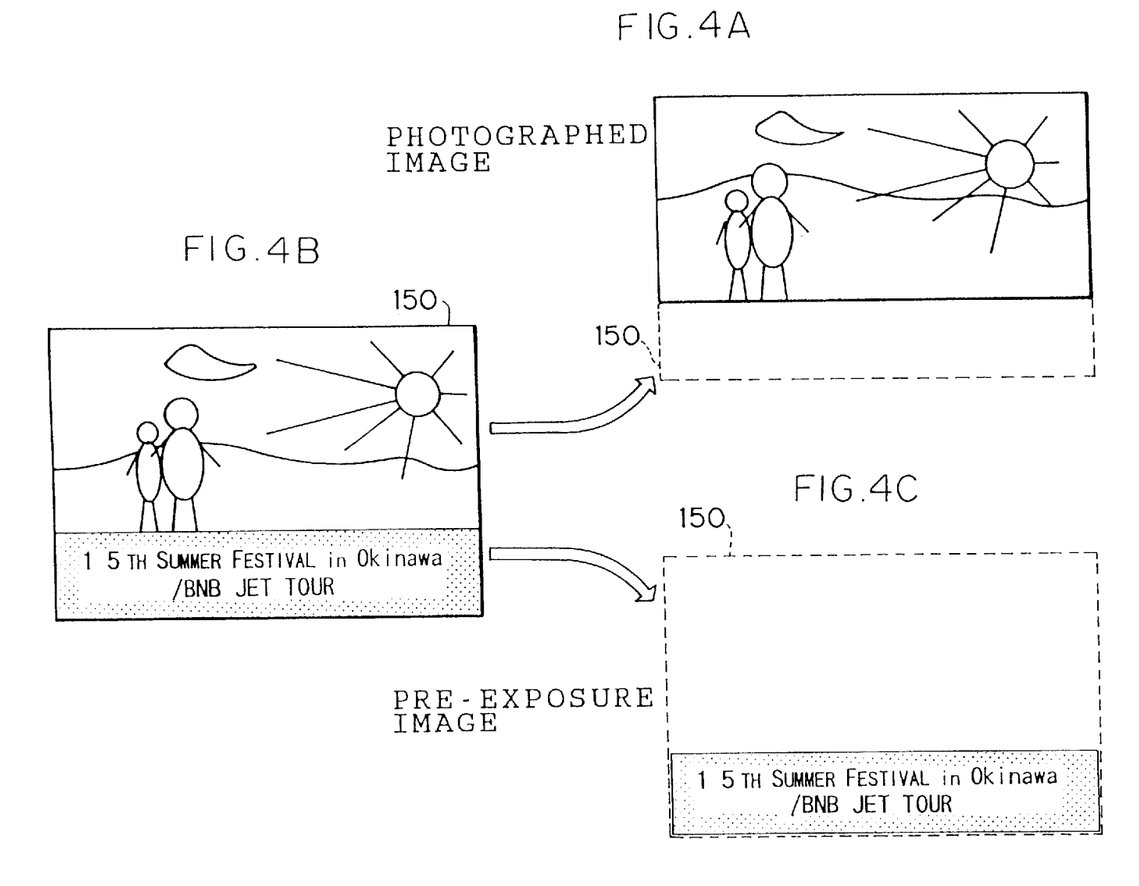
FIG. 4A is a front view of a photographic print including a pre-exposure image.
FIG. 4B is a diagram which shows a photographed image region shown in FIG. 4A.
FIG. 4C is a diagram which shows a pre-exposure image region shown in FIG. 4A.

FIG. 4 shows an example of an image (a photographic print 150) photographed using a photographic film with a pre-exposure image being in advance recorded thereon, which the photographic film is placed on sale in an exhibition site or in an amusement park. The pre-exposure image includes images such as a copy for advertisements relating to an exhibition, a character, and a mascot in an amusement park. When the pre-exposure image is a mascot, a photographer can obtain such an image that a main subject and the mascot are photographed together without practically photographing the mascot with the main subject, and further, can read, from the image, a photographing place in a later date.

Incidentally, since the pre-exposure image is not an image photographed through a lens, a photographing state of the pre-exposure image is different from that of a practically photographed image. For this reason, when the same correction is performed for the pre-exposure image and the photographed image, for example, a pre-exposure image in which a decrease in the amount of light caused by lens aberration does not occur may be subjected to the ambient light quantity correction or a pre-exposure image with no distortion occurring (in a marginal region thereof) may be subjected to the distortion aberration correction. As a result, such corrections exert more adverse effects on the image.

Accordingly, in the present embodiment, the photographed image and the pre-exposure image are separated from each other prior to the corrections.

As shown in FIG. 3, when magnetic information (or optical information) is read in the data processing portion

200, the magnetic information includes information which indicates that a pre-exposure image exists or not, positional information of the pre-exposure image, and printing information, a determination is made, based on the magnetic information, as to whether an image is separated in an image separating portion 152, and when the image is required to be separated, the position (region) to be separated is determined.

Also, the magnetic information includes an identification code 154 (see FIG. 5) recorded for specifying the pre-exposure image. The identification code 154 is transferred to a pre-exposure image memory 156.

As shown in FIG. 5, the pre-exposure image memory 156 is comprised of a data base portion 158 and a file portion 162 including a plurality of frame memories 160.

In the data base portion 158, the identification code 154 and a file number 164 for specifying the frame memory 160 of the file portion 162 correspond to each other, and corresponding pre-exposure image data can be read based on the identification code 154.

Namely, in the present embodiment, image data read from a pre-exposure image practically recorded on the photographic film 68 is not used, and identical image data is read from the pre-exposure image memory 156 and is used.

The pre-scan image data and the photographed image data separated as described above are combined with each other in each of image composite portions 168 and 170 of the pre-scan processing portion 212 and the main scan processing portion 218.

Figure 6A:
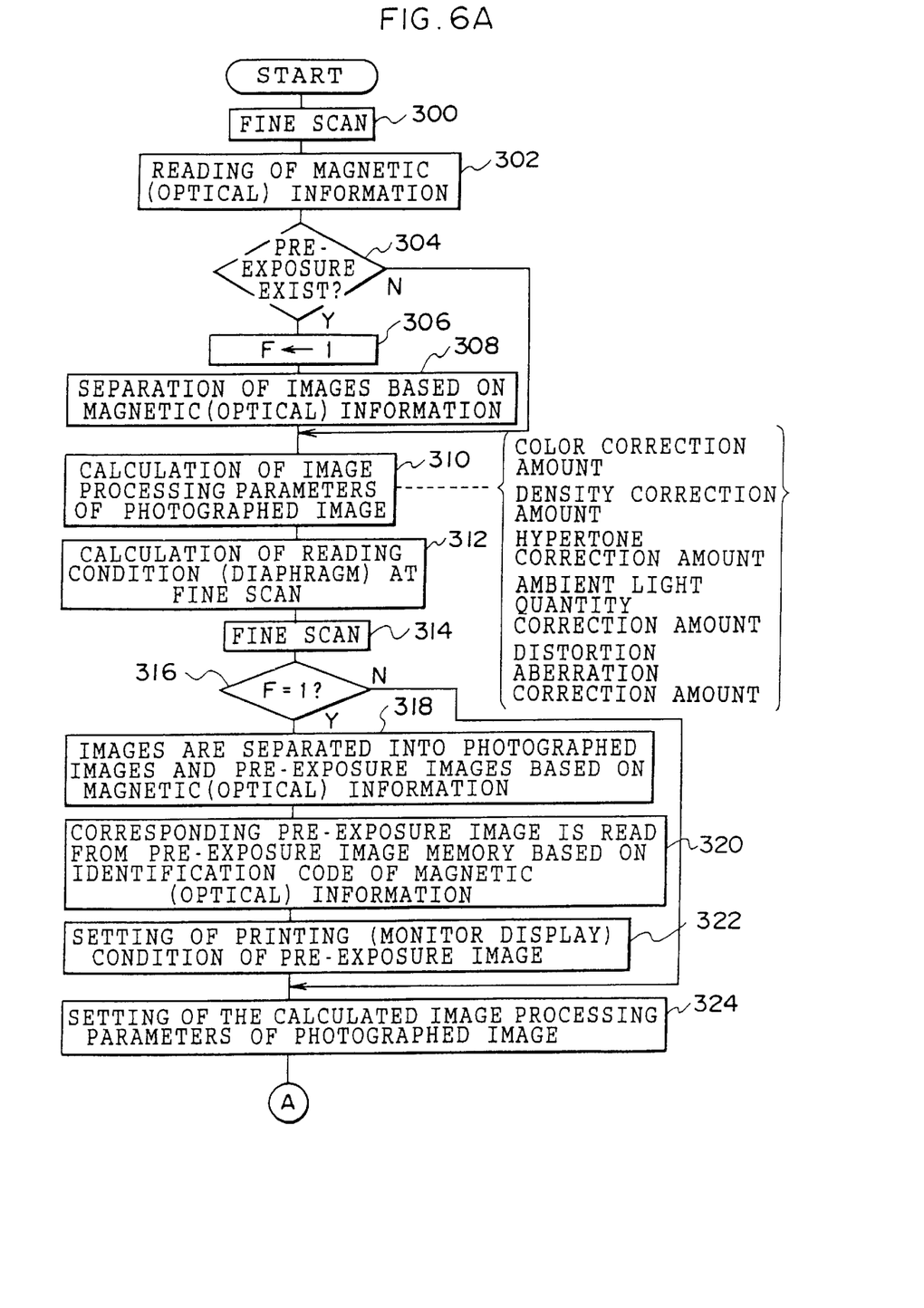
FIGS. 6A and 6B are control flow charts according to the embodiment of the present invention.
Figure 6B:
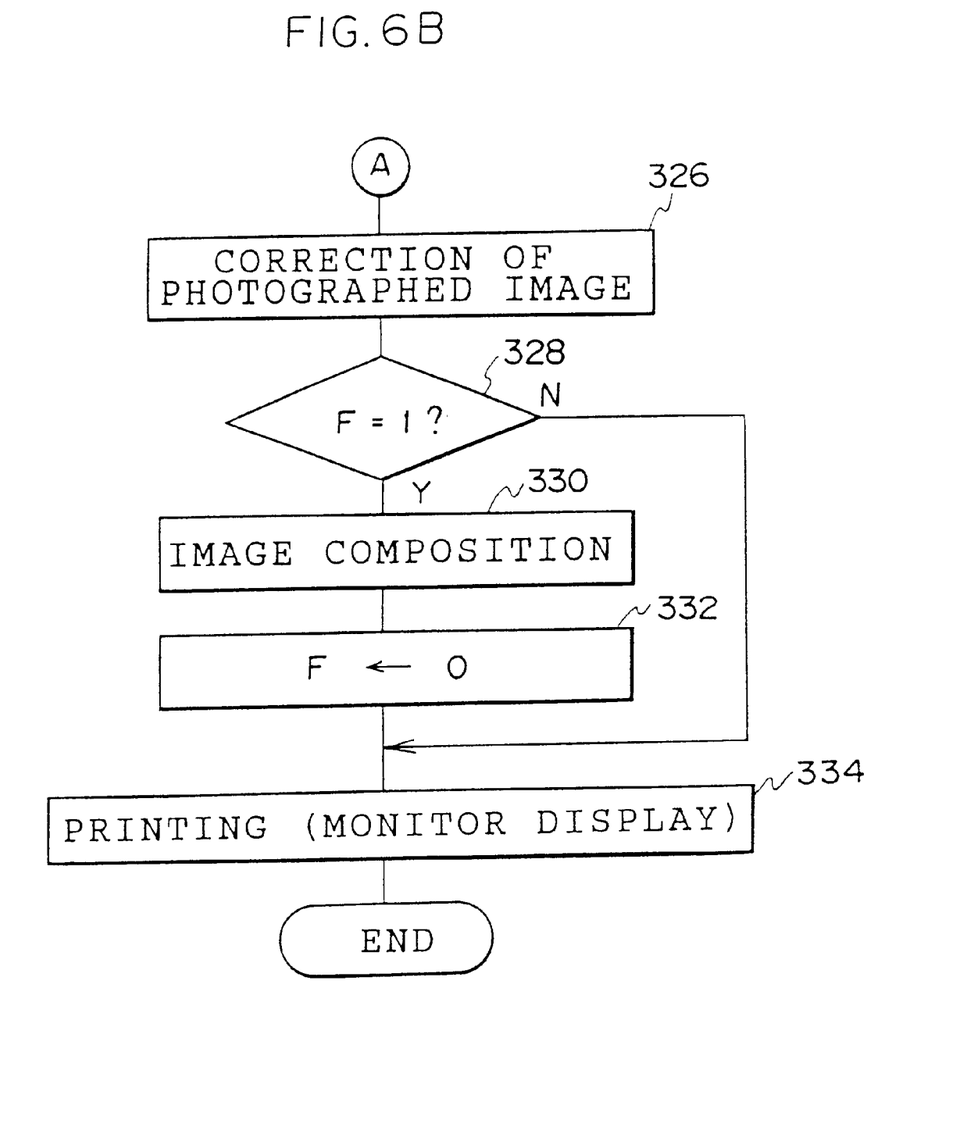

Next, a description will be given of an operation of the present embodiment with reference to the flow chart shown in FIG. 6.

When an operator inserts the photographic film 68 in the film carrier 74 and gives an instruction for start of reading a frame image by the keyboard 16K of the image processing section 16, conveying of the photographic film 22 is started and pre-scan is performed (step 300). That is, a frame image and various data of a portion not including an image recording region of the photographic film 68 are read by the line CCD scanner 14 while the photographic film 68 is being conveyed at a relatively high speed.

In the subsequent step 302, magnetic (optical) information is read and the size of a frame image is recognized. For example, in the case of a frame image of panorama size, whiteness regions which is peculiar to a panorama-size image (at both ends in the transverse direction of the photographic film) are shielded from the light.

The magnetic (optical) information includes information indicating whether a pre-exposure image exists, positional information of a pre-exposure image, printing information of a pre-exposure image, and an identification code for specifying a pre-exposure image. In step 304, it is determined whether the pre-exposure image exists.

When it is determined that the pre-exposure image exists in step 304, the process proceeds to step 306, in which a flag F is set at 1 (F←1). Subsequently, the process proceeds to step 308, in which images are divided into photographed images and pre-exposure images based on the positional information recorded as the magnetic (optical) information, and the process proceeds to step 310. When the decision of step 304 is no, the process proceeds to step 310.

In step 310, image processing parameters of a photographed image, i.e., color correction amount, density correction amount, hypertone correction amount, amount of correction for ambient light, and amount of correction for distortion aberration are calculated. Subsequently, in step 312, a reading condition (diaphragm) at fine scan is calculated, and the process proceeds to step 314.

In step 314, fine scan is performed, and thereafter, the process proceeds to step 316. In step 316, it is determined whether the flag F is set at 1 (F←1). When the decision of step 316 is yes, the process proceeds to step 318, in which based on the positional information of the magnetic (optical) information, images are divided into photographed images and pre-exposure images.

In the subsequent step 320, based on the identification code 154 recorded as the magnetic (optical) information, corresponding pre-exposure image data is read from the pre-exposure image memory 156. In step 322, a printing condition (monitor display condition) of a pre-exposure image is set, and the process proceeds to step 324. When the decision of step 316 is no, the process proceeds to step 324.

In step 324, image processing parameters of a photographed image are set. In the subsequent step 326, correction for the photographed image is performed.

In step 328, it is determined again whether the flag F is set at 1 (F←1). When the decision of step 328 is yes, the process proceeds to step 330, in which the photographed image (after correction) and the pre-exposure image (read from the pre-exposure image memory) are combined. The process proceeds to step 332, in which the flag F is reset (F←0), and thereafter, the process further proceeds to step 334. When the decision of step 328 is no, the process proceeds to step 334.

In step 334, printing (monitor display) of a composite image is performed and this routine ends.

In the present embodiment, when a pre-exposure image is recorded on the photographic film 68, a photographed image and a pre-exposure image are in advance separated from each other and only the photographed image is corrected by calculating a predetermined image processing parameter. Accordingly, it is possible to prevent the pre-exposure image from being adversely affected by the correction. A typical example of the correction is correction for distortion aberration of a lens. Particularly, in an image photographed through a lens used by a lens-fitted film package (LF) or the like, distortion may occur in a marginal region of the image. Accordingly, the distorted image is properly corrected by performing the distortion aberration correction. However, the pre-exposure image is not an image photographed through the lens, and therefore, no distortion occurs therein. For this reason, with the pre-exposure image and the photographed image being previously separated from each other, the distortion aberration correction is provided so as not to be made for the pre-exposure image having no occurrence of distortion. Another example of this kind of correction is ambient light quantity correction. A pre-exposure image is not an image photographed through the lens, and therefore, no limb darkening occurs therein. Accordingly, by previously separating the pre-exposure image and the photographed image from each other, the ambient light quantity correction for compensating for a deficiency in the amount of light is not necessary for the pre-exposure image having no occurrence of limb darkening. Further, there is no possibility that an amount of light be increased for the pre-exposure image.

Figure 7:
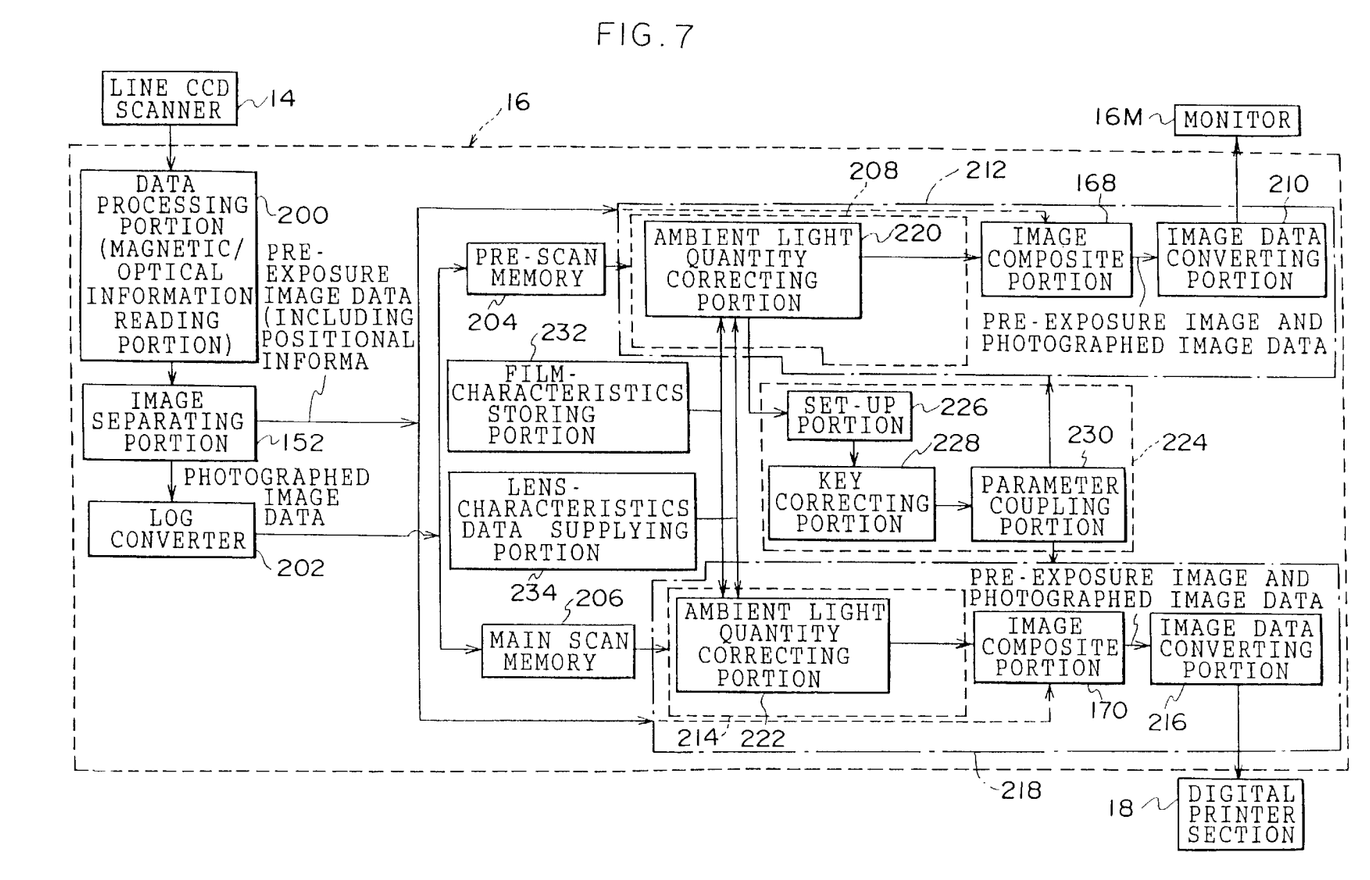
FIG. 7 is a control block diagram of an image processing section according to a modified example.

In the present embodiment, a pre-exposure image recorded on a photographic film is not used and an identical image is read from the pre-exposure image memory 156 and is combined with a photographed image. However, as shown in FIG. 7, when images are separated in the image separating portion, the photographed image and the pre-exposure image are both made valid and the separated pre-exposure image may be transferred to the image composite portions 168 and 170 of the pre-scan processing portion 212 and the main scan processing portion 218. Further, the read pre-exposure image may also be stored in storing means (memory 156).

As described above, the image processing method and apparatus according to the present invention has an excellent effect in that most suitable image corrections (particularly, distortion correction and ambient light quantity correction) can be performed for a film on which pre-exposure images are in advance recorded.

What is claimed is:

1. An image processing apparatus comprising:
    image reading means for reading an image recorded on a film, the image including a pre-exposure region on which a predetermined image is in advance exposed, and a photographing region for photographing;
    image separating means which separates image data of the image read by said image reading means into pre-exposure image data for the pre-exposure region and photographed image data for the photographing region;
    correcting means which independently calculates at least one of image processing parameters for the pre-exposure image data and the photographed image data based on the respective image data and effects image correction for at least one of the pre-exposure image data and the photographed image data; and
    image synthesizing means which combines the pre-exposure image data and the photographed image data, at least one of which is corrected by said correcting means.

2. An image processing apparatus according to claim 1, wherein said correcting means is provided to perform at least one of lens correction, color correction, and density correction.

3. An image processing apparatus according to claim 1, further comprising:
    film information reading means for reading film information recorded on the film,
    wherein the film information includes positional information of the pre-exposure image data, and said image separating means separates, based on the positional information of the pre-exposure image data which is read by said film information reading means, the image data into the pre-exposure image data and the photographed image data.

4. An image processing apparatus according to claim 1, wherein said correcting means corrects the photographed image data based on image processing parameters calculated based on only the photographed image data.

5. An image processing apparatus according to claim 1, wherein said correcting means corrects the pre-exposure image data based on image processing parameters previously set based on the film.

6. An image processing apparatus according to claim 1, wherein said correcting means corrects the pre-exposure image data based on the results of the correction of the photographed image data.

7. An image processing apparatus comprising:
    image reading means for reading an image recorded on a film, the image including a pre-exposure region on which a predetermined image is in advance exposed, and a photographing region for photographing;
    storage means for storing pre-exposure image data for the pre-exposure region, and pre-exposure image processing parameters including at least one of positional information of the pre-exposure image data and printing information of the pre-exposure image data;
    image separating means which separates image data of the image read by said image reading means into pre-exposure image data and photographed image data for the photographing region;
    correcting means which calculates image processing parameters based on the photographed image data and effects image correction for the photographed image data;
    image data reading means for reading the pre-exposure image data from said storage means; and
    image synthesizing means which combines the pre-exposure image data read by said image data reading means and the photographed image data corrected by said correcting means.

8. An image processing apparatus according to claim 7, wherein said correcting means is provided to perform at least one of lens correction, color correction, and density correction.

9. An image processing apparatus according to claim 7, wherein said storage means stores a plurality of pre-exposure image data based on identification means for identifying the pre-exposure image data, and said identification means corresponding to a pre-exposure image recorded in advance on the film is provided for at least one of the film and a cartridge in which the film is accommodated.

10. An image processing apparatus according to claim 9, wherein said identification means is a predetermined identification code.

11. An image processing apparatus according to claim 9, further comprising:
    film information reading means for reading film information recorded on at least one of the film and the cartridge,
    wherein the film information includes said identification means, and based on said identification means read by said film information reading means, said image data reading means reads the pre-exposure image data from said storage means.

12. An image processing method comprising:
    reading an image recorded on a film, the image including a pre-exposure region on which a predetermined image is in advance exposed, and a photographing region for photographing;
    separating image data of the image read into pre-exposure image data for the pre-exposure region and photographed image data for the photographing region;
    correcting at least one of the pre-exposure image data and the photographed image data by independently calculating image processing parameters for the pre-exposure image data and the photographed image data based on the respective image data; and
    combining the pre-exposure image data and the photographed image data, at least one of which is corrected based on the calculated parameters.

* * * * *